US012768601B2

(12) United States Patent
Yamaguchi

(10) Patent No.: US 12,768,601 B2
(45) Date of Patent: Oct. 20, 2026

(54) HEAT EXCHANGER AND METHOD FOR MANUFACTURING HEAT EXCHANGER

(71) Applicant: FUTABA INDUSTRIAL CO., LTD., Okazaki (JP)

(72) Inventor: Hiroki Yamaguchi, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 43 days.

(21) Appl. No.: 18/830,251

(22) Filed: Sep. 10, 2024

(65) Prior Publication Data

US 2025/0085066 A1 Mar. 13, 2025

(30) Foreign Application Priority Data

Sep. 13, 2023 (JP) ................................ 2023-148413
Aug. 27, 2024 (JP) ................................ 2024-145781

(51) Int. Cl.
*F28F 3/12* (2006.01)
*H01M 10/613* (2014.01)
(Continued)

(52) U.S. Cl.
CPC ............ *F28F 3/12* (2013.01); *H01M 10/613* (2015.04); *H01M 10/625* (2015.04);
(Continued)

(58) Field of Classification Search
CPC ...... F28F 3/12; F28F 2275/06; H01M 10/613; H01M 10/625; H01M 10/656; H01M 2220/20
See application file for complete search history.

(56) References Cited

U.S. PATENT DOCUMENTS 5,860,471 A * 1/1999 Perryment ............ F25B 39/024 165/170
2006/0054664 A1* 3/2006 Strobel ............... H01M 8/0258 228/179.1
(Continued)

FOREIGN PATENT DOCUMENTS

CN 116979187 A * 10/2023 ........ H01M 10/6554
JP 2020510534 A 12/2019

OTHER PUBLICATIONS

CN-116979187-A mt (Year: 2023).*

*Primary Examiner* — Gordon A Jones
(74) *Attorney, Agent, or Firm* — Withrow + Terranova, PLLC; Vincent K. Gustafson

(57) ABSTRACT

A heat exchanger includes a first plate member, a second plate member, and two or more joints. The first plate member faces a battery. The second plate member is arranged to face the first plate member, and forms a flow path through which a heat exchange medium passes between the first plate member and the second plate member. The joints are portions where the first plate member and the second plate member are joined by welding, and each have one of weld lines that extend in a first direction and are aligned in a second direction orthogonal to the first direction to define the flow path. Among the weld lines, a weld line(s) located closer to the first plate member side than a neutral axis is referred to as a first weld line, and a weld line(s) located closer to the second plate member side than the neutral axis is referred to as a second weld line. A sum of shortest distances from the neutral axis to each of the first weld lines is approximately the same as a sum of shortest distances from the neutral axis to each of the second weld lines.

6 Claims, 10 Drawing Sheets

(51) Int. Cl.
*H01M 10/625* (2014.01)
*H01M 10/656* (2014.01)

(52) U.S. Cl.
CPC ....... *H01M 10/656* (2015.04); *F28F 2275/06* (2013.01); *H01M 2220/20* (2013.01)

(56) References Cited

U.S. PATENT DOCUMENTS

| | | | | |
|---|---|---|---|---|
| 2010/0012303 | A1* | 1/2010 | Domen | F28D 1/0316 165/170 |
| 2019/0366877 | A1 | 12/2019 | Blersch et al. | |
| 2021/0391608 | A1* | 12/2021 | Senf | H01M 10/63 |
| 2023/0344032 | A1* | 10/2023 | Lipperheide | H01M 10/653 |
| 2025/0140971 | A1* | 5/2025 | Mounier | H01M 10/6556 |
| 2025/0349937 | A1* | 11/2025 | Kobayashi | F28F 3/12 |

* cited by examiner

HEAT EXCHANGER AND METHOD FOR MANUFACTURING HEAT EXCHANGER

CROSS-REFERENCE TO RELATED APPLICATIONS

This application claims the benefit of Japanese Patent Application No. 2023-148413 filed on Sep. 13, 2023 with the Japan Patent Office and Japanese Patent Application No. 2024-145781 filed on Aug. 27, 2024 with the Japan Patent Office, the entire disclosures of which are incorporated herein by reference.

BACKGROUND

The present disclosure relates to a heat exchanger and a method for manufacturing a heat exchanger.

Japanese Unexamined Patent Application Publication No. 2020-510534 discloses a heat exchanger for cooling a battery installed in an electric vehicle by exchanging heat with the battery. This heat exchanger comprises two plate-like members joined by laser beam welding, and a flow path formed between the two plate-like members through which a heat exchange medium passes. The flow path is defined by two or more joints where the two plate-like members are joined and aligned in an orthogonal direction to a flow direction of the heat exchange medium. Japanese Unexamined Patent Application Publication No. 2020-510534 discloses a configuration in which the joints are arranged on a neutral axis that extends in the orthogonal direction in a cross section of the heat exchanger along the orthogonal direction. Japanese Unexamined Patent Application Publication No. 2020-510534 also discloses a configuration in which the joints are arranged away from the neutral axis on a cooling surface of the plate-like member facing the battery, the cooling surface contacting the battery and expanding flatly in parallel to the neutral axis of the heat exchanger.

SUMMARY

However, when the joints are arranged on the neutral axis of the heat exchanger, the cooling surface of the heat exchanger that contacts the battery tends to be small since the heat exchanger does not contact the battery at positions provided with the joints. Thus, there has been a problem in which cooling performance of the heat exchanger for the battery easily is reduced.

In addition, when the joints are arranged away from the neutral axis on the flat cooling surface of the heat exchanger, the cooling surface tends to be deformed by thermal distortion of the heat exchanger caused by shrinkage stress when the joints cool down, which makes it difficult for the cooling surface to contact the battery. Thus, there has been a problem in which cooling performance of the heat exchanger for the battery easily is reduced.

In one aspect of the present disclosure, it is preferable to improve the cooling performance of the heat exchanger for the battery.

Means for Solving the Problems

One aspect of the present disclosure is a heat exchanger that exchanges heat with a battery installed in an electric vehicle, and the heat exchanger comprises a first plate member, a second plate member, and two or more joints. The first plate member is a plate-like member configured to face the battery. The second plate member is a plate-like member that is arranged to face an opposite side of a side facing the battery of the first plate member and forms a flow path through which a heat exchange medium passes between the first plate member and the second plate member. The joints are portions where the first plate member and the second plate member are joined by welding. Also, each of the joints has one of weld lines that extend in a first direction and are aligned in a second direction orthogonal to the first direction to define the flow path. Each of the weld lines is arranged on either of the first plate member side and the second plate member side with respect to a neutral axis that extends in the second direction in a cross section of the heat exchanger orthogonal to the first direction. Among the weld lines, a weld line(s) located closer to the first plate member than the neutral axis is referred to as at least one first weld line, and a weld line(s) located closer to the second plate member than the neutral axis is referred to as at least one second weld line. A sum of shortest distances from the neutral axis to each of the at least one first weld line is approximately the same as a sum of shortest distances from the neutral axis to each of the at least one second weld line.

With the configuration as such, deformation caused on the heat exchanger by shrinkage stress when the first weld line cools down is likely to be offset by deformation caused on the heat exchanger by shrinkage stress when the second weld line cools down. Thus, the effect of thermal distortion of the heat exchanger comprising joints formed by welding is reduced. That is, deformation of the first plate member is inhibited, making it easier for the first plate member to contact the battery. Accordingly, cooling performance of the heat exchanger for the battery can be improved.

In one aspect of the present disclosure, a number of the at least one first weld line and a number of the at least one second weld line may be the same. The shortest distances from the neutral axis to each of the at least one first weld line and the shortest distances from the neutral axis to each of the at least one second weld line may be the same.

With the configuration as such, deformation caused on the heat exchanger by the first weld line is likely to be offset by deformation caused on the heat exchanger by the second weld line. Thus, the effect of thermal distortion of the heat exchanger comprising joints formed by welding is reduced. Accordingly, cooling performance of the heat exchanger for the battery can be improved.

In one aspect of the present disclosure, the weld lines may be arranged line-symmetrically with respect to a center line in a cross section of the heat exchanger orthogonal to the first direction. The center line may be a line that passes through a center of the second direction in the cross section of the heat exchanger orthogonal to the first direction and is perpendicular to the neutral axis.

According to the configuration as such, the effect of thermal distortion of the heat exchanger can be reduced in each portion on both sides of the center line.

In one aspect of the present disclosure, the first direction may be a longer direction of the heat exchanger.

The weld line extending in the longer direction of the heat exchanger has a larger effect on thermal distortion of heat exchanger than the weld line extending in a shorter direction of the heat exchanger. Thus, according to the configuration described above, it becomes easier to reduce the effect of thermal distortion of the heat exchanger.

In one aspect of the present disclosure, the first plate member may have a contact portion. The contact portion is a portion that contacts the battery, and expands in approximately parallel to the neutral axis and approximately flatly in the first direction and the second direction. The at least one first weld line may be arranged in the contact portion.

According to the configuration as such, since a portion of the contact portion provided with the flow path and a portion of the contact portion provided with the first weld line contact the battery, an area of a surface of the contact portion that contacts the battery and exchanges heat with the battery can be increased. Accordingly, cooling performance of the heat exchanger for the battery can be further improved.

In one aspect of the present disclosure, the weld lines may be formed by heat input to the joints. A sum of values obtained for each of the at least one first weld line by multiplying the shortest distance from the neutral axis to each of the at least one first weld line by an amount of heat input during formation of each of the at least one first weld line may be approximately the same as a sum of values obtained for each of the at least one second weld line by multiplying the shortest distance from the neutral axis to each of the at least one second weld line by an amount of heat input during formation of each of the at least one second weld line.

With the configuration as such, the amount of heat input during formation of each weld line, in addition to the shortest distance from the neutral axis to each weld line, is taken into consideration of evaluation of the effect of thermal distortion of the heat exchanger. As a result, for example, even if shrinkage stress when each weld line cools down differs due to difference in the amount of heat input during formation of each weld line, deformation caused on the heat exchanger by the first weld line is likely to be offset by deformation caused on the heat exchanger by the second weld line. Thus, also in the heat exchanger comprising joints to which heat is input under different conditions during welding, the effect of thermal distortion is reduced. Accordingly, cooling performance of the heat exchanger for the battery can be improved.

In one aspect of the present disclosure, a method for manufacturing a heat exchanger may comprise: placing the first plate member and the second plate member on top of each other so that the first plate member and the second plate member are in contact at the joints; and forming two or more weld lines by heat input to the joints to join the first plate member and the second plate member. A sum of values obtained for each of the at least one first weld line by multiplying the shortest distance from the neutral axis to each of the at least one first weld line by an amount of heat input during formation of each of the at least one first weld line may be approximately the same as a sum of values obtained for each of the at least one second weld line by multiplying the shortest distance from the neutral axis to each of the at least one second weld line by an amount of heat input during formation of each of the at least one second weld line.

With the configuration as such, the amount of heat input during formation of each weld line, in addition to the shortest distance from the neutral axis to each weld line, is taken into consideration of evaluation of the effect of thermal distortion of the heat exchanger. As a result, for example, even if shrinkage stress when each weld line cools down differs due to difference in the amount of heat input during formation of each weld line, deformation caused on the heat exchanger by the first weld line is likely to be offset by deformation caused on the heat exchanger by the second weld line. Thus, also in the heat exchanger comprising joints to which heat is input under different conditions during welding, the effect of thermal distortion is reduced. Accordingly, cooling performance of the heat exchanger for the battery can be improved.

BRIEF DESCRIPTION OF THE DRAWINGS

Example embodiments of the present disclosure will be described hereinafter with reference to the accompanying drawings.

MODE FOR CARRYING OUT THE INVENTION

1. Configuration

Figure 1:
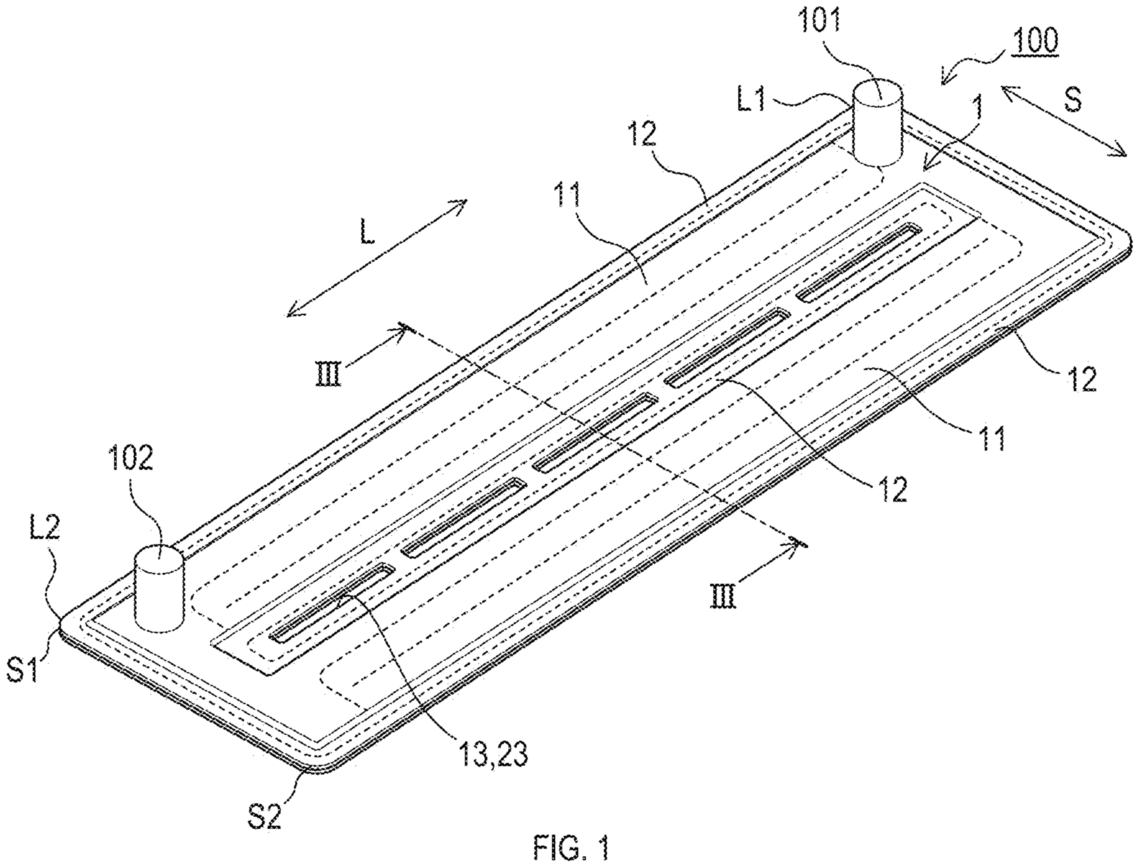
FIG. 1 It is a schematic perspective view of a heat exchanger.

A heat exchanger 100 shown in FIG. 1 cools or heats a battery installed in an electric vehicle by exchanging heat with the battery. An electric vehicle is a vehicle that runs using electrical energy stored in a battery as all or part of the vehicle's power. The electric vehicle includes an electric car, a plug-in hybrid car, a hybrid car, a fuel cell car, and the like. The heat exchanger 100 is configured to allow a heat exchange medium such as cooling water to flow through the heat exchanger 100. The heat exchanger 100 comprises an inflow port 101 through which the heat exchange medium flows into the heat exchanger 100, and a discharge port 102 through which the heat exchange medium is discharged from the heat exchanger 100.

In the present embodiment, the inflow port 101 and the discharge port 102 are provided on a first plate member 1 which will be described later. Specifically, the inflow port 101 is arranged at a first end S1 in a shorter direction S of the heat exchanger 100 and at a first end L1 in a longer direction L of the heat exchanger 100. The discharge port 102 is arranged at the first end S1 in the shorter direction S of the heat exchanger 100 and at a second end L2 in the longer direction L of the heat exchanger 100. Locations of the inflow port and the discharge port in the heat exchanger can vary depending on a shape of a flow path through which the heat exchange medium flows.

Figure 2:
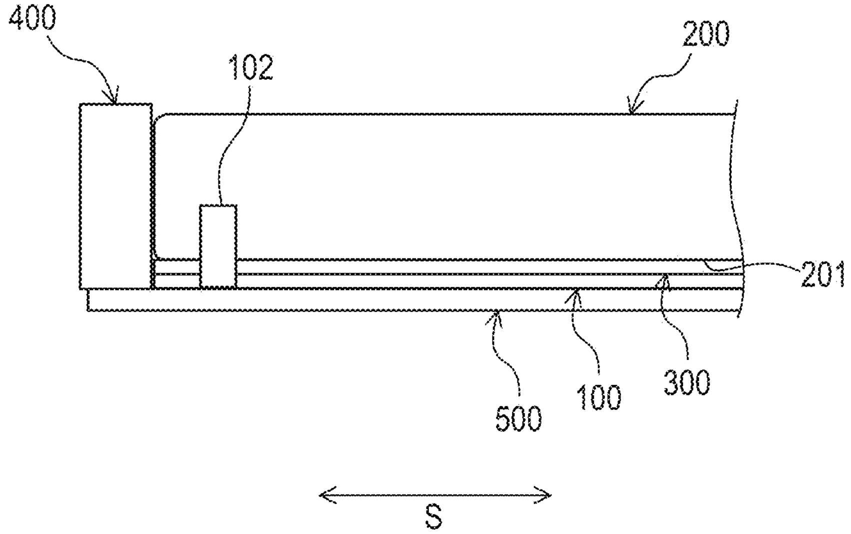
FIG. 2 It is a side view of the heat exchanger schematically showing arrangement with respect to a battery.

As shown in FIG. 2, the heat exchanger 100 faces a contact surface 201 of a battery 200 and is arranged so that the battery 200 is located between the inflow port 101 and the discharge port 102. A thermal conductive material 300 is arranged between the heat exchanger 100 and the battery 200. The thermal conductive material does not have to be arranged between the heat exchanger and the battery. A frame 400 is provided to surround a side surface extending orthogonal to the contact surface 201 of the battery 200. The heat exchanger 100 is located inside the frame 400. A surface of the heat exchanger 100 opposite to a surface facing the battery 200 is covered by a lower case 500. In FIG. 2, illustration of a part of the frame 400 is omitted for convenience.

In the heat exchanger 100 in a state installed in the electric vehicle, the longer direction L may be a front-rear direction of the electric vehicle and the shorter direction S may be a right-left direction of the electric vehicle, or the longer direction L may be the right-left direction of the electric vehicle and the shorter direction S may be the front-rear direction of the electric vehicle.

Figure 3:
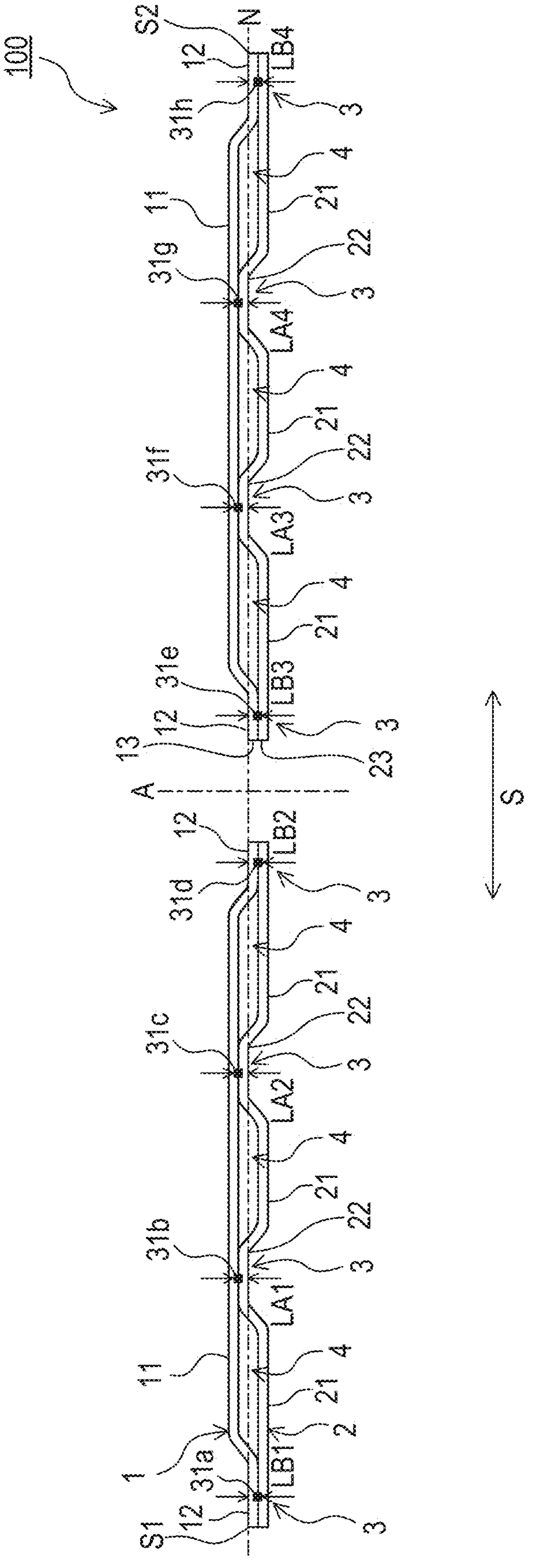
FIG. 3 It is an end view of the heat exchanger in a cross section taken along a line III-III in FIG. 1.

As shown in FIG. 3, in the present embodiment, the heat exchanger 100 comprises the first plate member 1, a second plate member 2, eight joints 3, and six flow paths 4.

<First Plate Member 1>

The first plate member 1 is a plate material having an approximately rectangular shape, and faces the contact surface 201 of the battery 200. The first plate member 1 is made of a metal with high thermal conductivity such as aluminum, for example. The first plate member may be made of a metal with high corrosion resistance such as stainless steel. The first plate member 1 has two contact portions 11 and three non-contact portions 12.

Each contact portion 11 is a portion of the first plate member 1 that indirectly or directly contacts the battery 200. Each contact portion 11 expands in approximately parallel to a neutral axis N that extends in the shorter direction S in a cross section of the heat exchanger 100 orthogonal to the longer direction L (hereinafter, simply referred to as the cross section) and approximately flatly in the longer direction L and the shorter direction S. The neutral axis is a line where a neutral surface and the cross section intersect. The neutral surface is a surface of an object where neither compressive strain nor tensile strain occurs. On the neutral axis, even if a bending moment acts on the object, the tensile force and the compressive force are balanced so that no stress intensity is generated in the cross section. The two contact portions 11 are located on the same plane, and are aligned in the shorter direction S.

Each non-contact portion 12 extends in the longer direction L of the heat exchanger 100. The three non-contact portions 12 are located on the same plane, and are aligned in the shorter direction S. Among the three non-contact portions 12, one non-contact portion 12 is located at the first end S1 in the shorter direction S, another non-contact portion 12 is located at a second end S2 in the shorter direction S, and the other non-contact portion 12 is located between the two contact portions 11. The two contact portions 11 protrude toward a side where the battery 200 is arranged (for example, upward) from the three non-contact portions 12. That is, a difference in level is formed between each non-contact portion 12 and each contact portion 11. In the present embodiment, the first plate member 1 has two or more through holes 13 in the non-contact portion 12 located between the two contact portions 11. The through holes 13 are aligned apart from each other in the longer direction L. The first plate member does not have to have through holes in the non-contact portion located between the two contact portions.

<Second Plate Member>

The second plate member 2 is a plate material having an approximately rectangular shape, and is arranged to face an opposite side of a side facing the battery 200 of the first plate member 1. For example, when the contact surface 201 of the battery 200 installed in the electric vehicle expands in an approximately horizontal direction, the second plate member 2 is arranged below or above the first plate member 1. Also, for example, when the contact surface 201 of the battery 200 installed in the electric vehicle expands in an approximately vertical direction, the second plate member 2 is arranged on the left, right, front or rear of the first plate member 1. The second plate member 2, similar to the first plate member 1, is made of a metal with high thermal conductivity such as aluminum, for example. The second plate member may be made of a metal with high corrosion resistance such as stainless steel. The second plate member 2 has five plate-like portions 21 and four projections 22.

Each plate-like portion 21 is a portion that is not in contact with any of the contact portions 11 of the first plate member 1, and expands in approximately parallel to the neutral axis N and approximately flatly in the longer direction L and the shorter direction S. The five plate-like portions 21 are located on the same plane, and are aligned in the shorter direction S. Among the five plate-like portions 21, one plate-like portion 21 located at the first end S1 in the shorter direction S, another plate-like portion 21 located at the second end S2 in the shorter direction S, and another plate-like portion 21 located at the center of the second plate member 2 are each in contact with the non-contact portion 12 of the first plate member 1 facing that plate-like portion 21. In the present embodiment, the second plate member 2 has two or more through holes 23 in the plate-like portion 21 located at the center of the shorter direction S. The through holes 23 are aligned apart from each other in the longer direction L. Each of the through holes 23 of the second plate member 2 overlaps with the corresponding one of the through holes 13 of the first plate member 1. The second plate member does not have to have the through holes in the plate-like portion located at the center of the shorter direction S.

Each projection 22 is a portion that is in contact with either of the contact portions 11 of the first plate member 1, and extends in the longer direction L of the heat exchanger 100. The four projections 22 are aligned in the shorter direction S, and are each located between the adjacent two plate-like portions 21. The four projections 22 protrude toward the first plate member 1 side from the five plate-like portions 21. That is, a difference in level is formed between each projection 22 and each plate-like portion 21.

<Joint>

The eight joints 3 are portions where the first plate member 1 and the second plate member 2 are joined by welding, and extend in the longer direction L of the heat exchanger 100. For welding, for example, laser welding, arc welding, or the like is used.

Each joint 3 is provided at a portion where each of the contact portions 11 of the first plate member 1 and any of the projections 22 of the second plate member 2 are in contact, and at a portion where each of the non-contact portions 12 of the first plate member 1 and any of the plate-like portions 21 of the second plate member 2 are in contact. The two contact portions 11 of the first plate member 1 and the five plate-like portions 21 of the second plate member 2 are not in contact, and face each other with a space therebetween. As a result, the six flow paths 4 through which the heat exchange medium passes are formed between the first plate member 1 and the second plate member 2.

Figure 4:
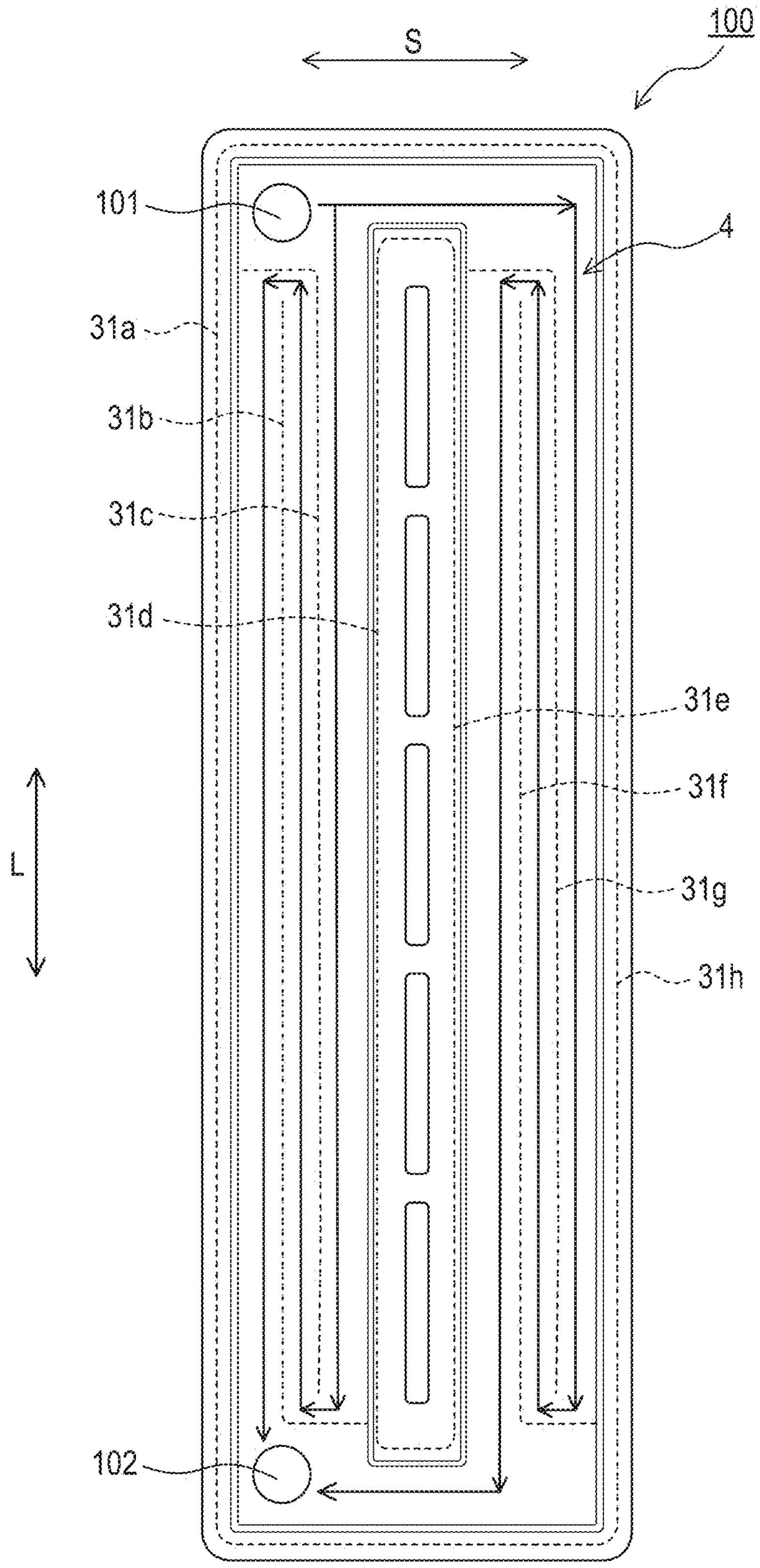
FIG. 4 It is a schematic plan view of the heat exchanger.

As shown in FIGS. 3 and FIG. 4, each joint 3 has a weld line. In the present embodiment, the heat exchanger 100 has eight weld lines 31*a* to 31*h*. The eight weld lines 31*a* to 31*h* each extend in parallel to the neutral surface along the neutral axis N and straight in the longer direction L, and are aligned in the shorter direction S to define the six flow paths 4 between the first plate member 1 and the second plate member 2. Some of the eight weld lines 31*a* to 31*h* are arranged on the first plate member 1 side with respect to the neutral axis N, and the rest are arranged on the second plate member 2 side. In the following description, among the eight weld lines 31*a* to 31*h*, weld lines located closer to the first plate member 1 side than the neutral axis N are also referred to as first weld lines 31*b*, 31*c*, 31*f*, 31*g*, and weld lines located closer to the second plate member 2 side than the neutral axis N are also referred to as second weld lines 31*a*, 31*d*, 31*e*, 31*h*.

The eight weld lines 31*a* to 31*h* are arranged line-symmetrically with respect to a center line A in the cross section of the heat exchanger 100. The center line A is a line that passes the center of the shorter direction S in the cross section of the heat exchanger 100 and is perpendicular to the neutral axis N.

Specifically, the two first weld lines 31*b*, 31*c* are arranged in the contact portion 11 on the first end S1 side of the first plate member 1, and the two first weld lines 31*f*, 31*g* are arranged in the contact portion 11 on the second end S2 side of the first plate member 1. The second weld line 31*a* is arranged in the non-contact portion 12 located at the first end S1 of the first plate member 1, and the second weld line 31*h* is arranged in the non-contact portion 12 located at the second end S2 of the first plate member 1. The second weld line 31*d* is arranged closer to the first end S1 side than each of the through holes 13, 23 in the non-contact portion 12 located at the center of the shorter direction S of the first plate member 1, and the second weld line 31*e* is arranged closer to the second end S2 side than each of the through holes 13, 23 in that non-contact portion 12.

In addition, a sum of shortest distances LA1, LA2, LA3, LA4 from the neutral axis N to each of the first weld lines 31*b*, 31*c*, 31*f*, 31*g* is approximately the same as a sum of shortest distances LB1, LB2, LB3, LB4 from the neutral axis N to each of the second weld lines 31*a*, 31*d*, 31*e*, 31*h*. In the present embodiment, the number of the first weld lines 31*b*, 31*c*, 31*f*, 31*g* and the number of the second weld lines 31*a*, 31*d*, 31*e*, 31*h* are the same, which is four. Also, the shortest distances LA1, LA2, LA3, LA4 and the shortest distances LB1, LB2, LB3, LB4 are the same, which is, for example, 1.0 mm. That is, when the first weld lines 31*b*, 31*c*, 31*f*, 31*g* and the second weld lines 31*a*, 31*d*, 31*e*, 31*h* are equally distributed on either side of the neutral axis N as in the present embodiment, the following equation is established: (number of the first weld lines×shortest distance from the neutral axis N to the first weld line)=(number of the second weld lines×shortest distance from the neutral axis N to the second weld line).

Each end of the weld lines 31*a* to 31*h* in the longer direction L is coupled also by a weld line extending in the shorter direction S so that the six flow paths 4 are formed through which the heat exchange medium flows from the inflow port 101 to the discharge port 102 along arrows shown in FIG. 4.

<Method for Manufacturing Heat Exchanger>

Figure 14:
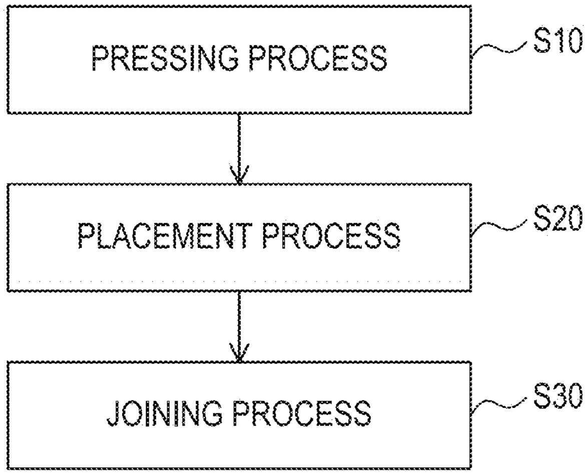
FIG. 14 It is a flowchart showing a method for manufacturing a heat exchanger.

Next, a method for manufacturing the heat exchanger 100 will be described by way of FIG. 14. The method for manufacturing the heat exchanger 100 includes a pressing process S10, a placement process S20, and a joining process S30.

(Pressing Process)

First, by pressing flat blank materials, the first plate member 1 and the second plate member 2 each having a specified shape are formed. Specifically, for the first plate member 1, press molding is performed so that the two contact portions 11 and the three non-contact portions 12 are formed. For the second plate member 2, press molding is performed so that the five plate-like portions 21 and four projections 22 are formed.

(Placement Process)

Next, the first plate member 1 and the second plate member 2 are placed on top of each other so that the first plate member 1 and the second plate member 2 are in contact at the respective joints 3 (see FIG. 3). Specifically, the first plate member 1 and the second plate member 2 are overlapped so that, at the respective joints 3, the two contact portions 11 and the four projections 22 are in contact with each other and the three non-contact portions 12 and the three plate-like portions 21 facing the three non-contact portions 12 are in contact with each other.

(Joining Process)

Next, the eight weld lines 31*a* to 31*h* are formed by heat input to the corresponding joints 3, and the first plate member 1 and the second plate member 2 are joined. Specifically, for example, a laser light is radiated on the respective joints 3 along the longer direction L. As a result, the eight weld lines 31*a* to 31*h* are formed so that the respective first weld lines 31*b*, 31*c*, 31*f*, 31*g* and the respective second weld lines 31*a*, 31*d*, 31*e*, 31*h* are arranged on either side of the neutral axis N as described above (see FIG. 3). The heat exchanger 100 is thereby obtained.

Each of the weld lines 31*a* to 31*h* is formed as the heat input to the corresponding joint 3 from a laser light or the like causes merging in the first plate member 1 and the second plate member 2. In the present embodiment, heat input to each joint 3 is carried out under certain conditions in the joining process S30. That is, an amount of heat input during formation of each of the weld lines 31*a* to 31*h* is approximately the same. The amount of heat input is calculated by the following expression: (output power during welding÷welding speed×welding length).

2. Effect

According to the embodiment detailed above, the following effects can be obtained.

(2a) In the present embodiment, the first weld lines 31*b*, 31*c*, 31*f*, 31*g* and the second weld lines 31*a*, 31*d*, 31*e*, 31*h* are equally distributed on either side of the neutral axis N. This makes it easier for deformation caused on the heat exchanger 100 by shrinkage stress when the respective first weld lines 31*b*, 31*c*, 31*f*, 31*g* cool down to be offset by deformation caused on the heat exchanger 100 by shrinkage stress when the respective second weld lines 31*a*, 31*d*, 31*e*, 31*h* cool down. Thus, the effect of thermal distortion of the heat exchanger 100 comprising the eight joints 3 is reduced. That is, deformation of the first plate member 1 is inhibited, making it easier for the two contact portions 11 of the first plate member 1 to indirectly or directly contact the battery 200. In other words, it becomes easier to maintain a surface of each contact portion 11 that faces the battery 200 and exchanges heat with the battery 200 in a flat state. Accordingly, cooling performance of the heat exchanger 100 for the battery 200 can be improved. In addition, since deformation of the first plate member 1 is inhibited, attachability of the heat exchanger 100 to the battery 200 is also improved.

(2b) In the present embodiment, the two first weld lines 31*b*, 31*c* are arranged in the contact portion 11 on the first end S1 side of the first plate member 1, and the two first weld lines 31*f*, 31*g* are arranged in the contact portion 11 on the second end S2 side of the first plate member 1. This causes a portion of each contact portion 11 provided with each flow path 4 and a portion of each contact portion 11 provided with each of the first weld lines 31*b*, 31*c*, 31*f*, 31*g* to indirectly or directly contact the battery 200. Thus, an area of a surface of each contact portion 11 that indirectly or directly contacts the battery 200 and exchanges heat with the battery 200 can be largely secured. Accordingly, cooling performance of the heat exchanger 100 for the battery 200 can be further improved.

(2c) In the present embodiment, the eight weld lines 31*a* to 31*h* are arranged line-symmetrically with respect to the center line A in the cross section of the heat exchanger 100. Thus, in each portion on both sides of the center line A, the effect of thermal distortion of the heat exchanger 100 can be reduced.

(2d) In the present embodiment, the eight weld lines 31*a* to 31*h* extend in the longer direction L of the heat exchanger 100. The weld line extending in the longer direction L of the heat exchanger 100 has a greater effect on thermal distortion of the heat exchanger 100 than the weld line extending in the shorter direction S of the heat exchanger 100. Thus, according to the configuration of the heat exchanger 100 of the present embodiment, it becomes easier to reduce the effect of thermal distortion of the heat exchanger 100.

In the present embodiment, the longer direction L corresponds to an example of the first direction, and the shorter direction S corresponds to an example of the second direction.

3. Other Embodiments

An embodiment of the present disclosure has been described in the above, but the present disclosure is not limited to the above-described embodiment, and may take various forms.

Figure 5:
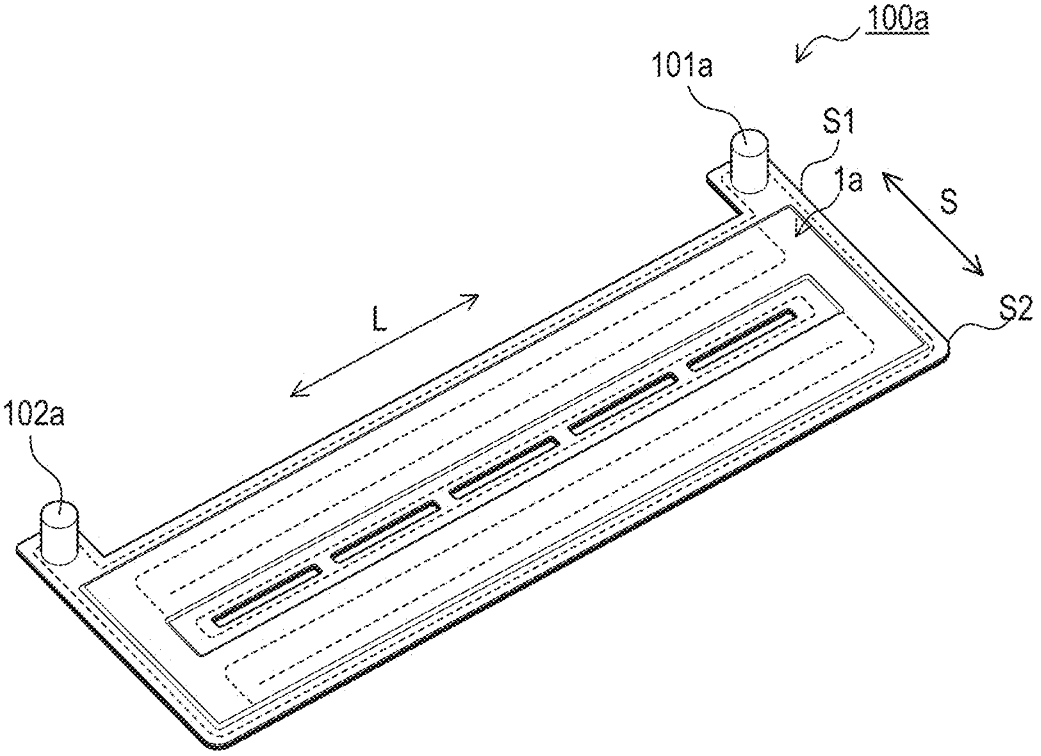
FIG. 5 It is a schematic perspective view of a heat exchanger of a first modified example.

(3a) In the above-described embodiment, the inflow port 101 and the discharge port 102 of the heat exchange medium are arranged on the first plate member 1, but arrangement of the inflow port and the discharge port is not limited to this. For example, as shown in FIG. 5 to FIG. 7, an inflow port 101*a* and a discharge port 102*a* of a heat exchanger 100*a* of a first modified example may be provided in portions of a first plate member 1*a* protruding from the first end S1 in the shorter direction S.

Figure 6:
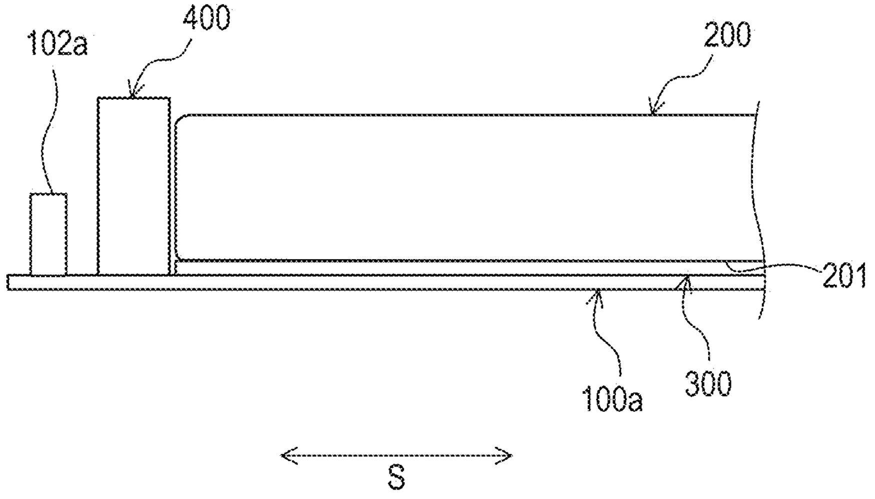
FIG. 6 It is a side view of the heat exchanger of the first modified example schematically showing arrangement with respect to the battery.
Figure 7:
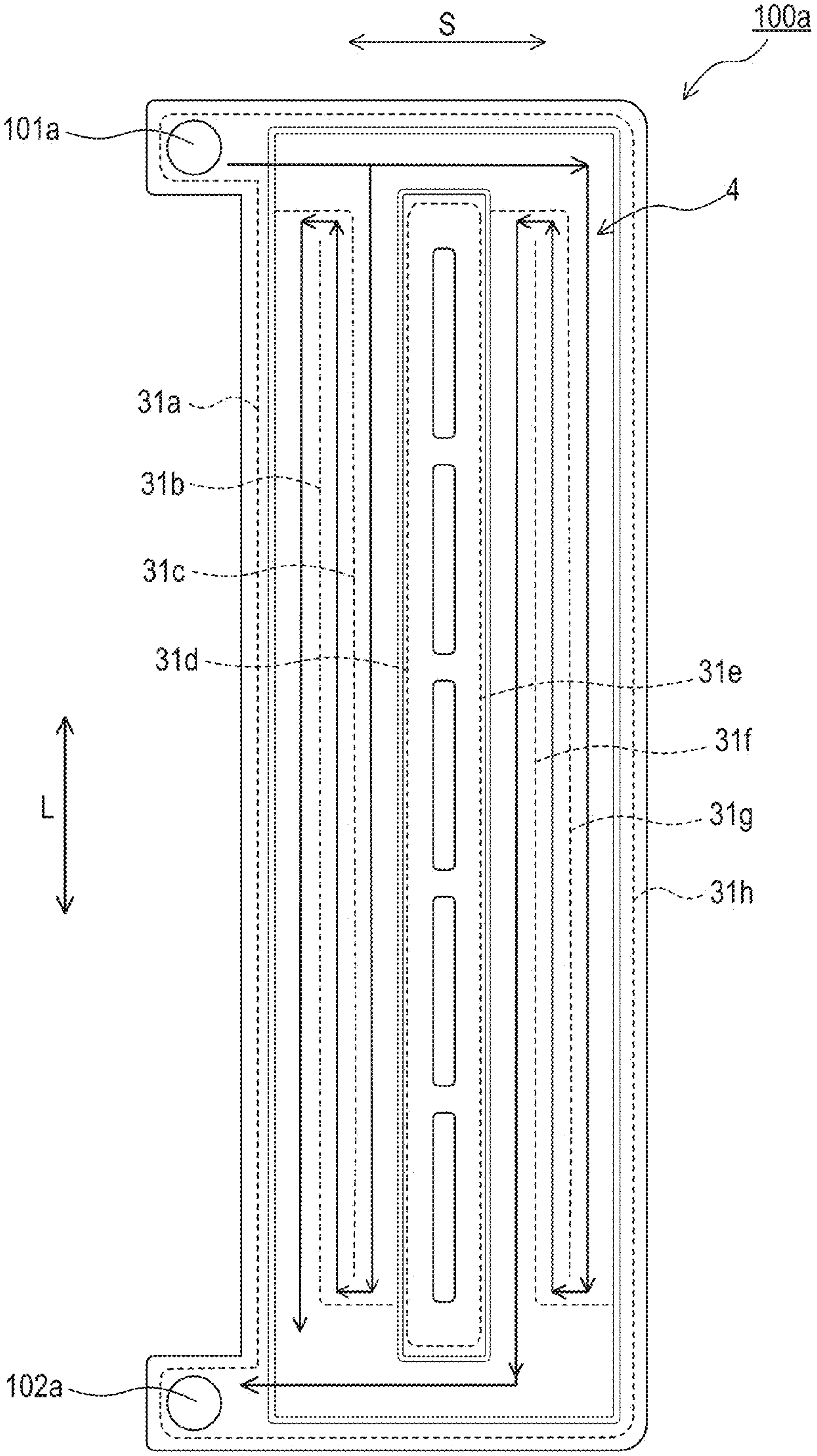
FIG. 7 It is a schematic plan view of the heat exchanger of the first modified example.

In this case, as shown in FIG. 6, the heat exchanger 100*a* faces the contact surface 201 of the battery 200, and is arranged so that the battery 200 does not overlap with the inflow port 101*a* and the discharge port 102*a* in the shorter direction S. The thermal conductive material 300 may or may not be arranged between the heat exchanger 100*a* and the battery 200. The frame 400 is provided to surround a side surface of the battery 200, and the inflow port 101*a* and the discharge port 102*a* are located outside the frame 400. In FIG. 6, illustration of a part of the frame 400 is omitted for convenience. The heat exchanger 100*a* of the first modified example can also take a role of a lower case. Thus, an opposite surface of a surface facing the battery 200 of the heat exchanger 100*a* does not have to be covered by a lower case, unlike the heat exchanger 100 of the above-described embodiment.

(3b) In the above-described embodiment, an example of the heat exchanger 100 was given in which the six flow paths 4 are formed by the eight joints 3 that have the four first weld lines 31*b*, 31*c*, 31*f*, 31*g* and the four second weld lines 31*a*, 31*d*, 31*e*, 31*h* equally distributed on either side of the neutral axis N. However, the configuration of the heat exchanger is not limited to this, and the number of the flow paths, that is, the number of the weld lines, is not limited.

Figure 8:
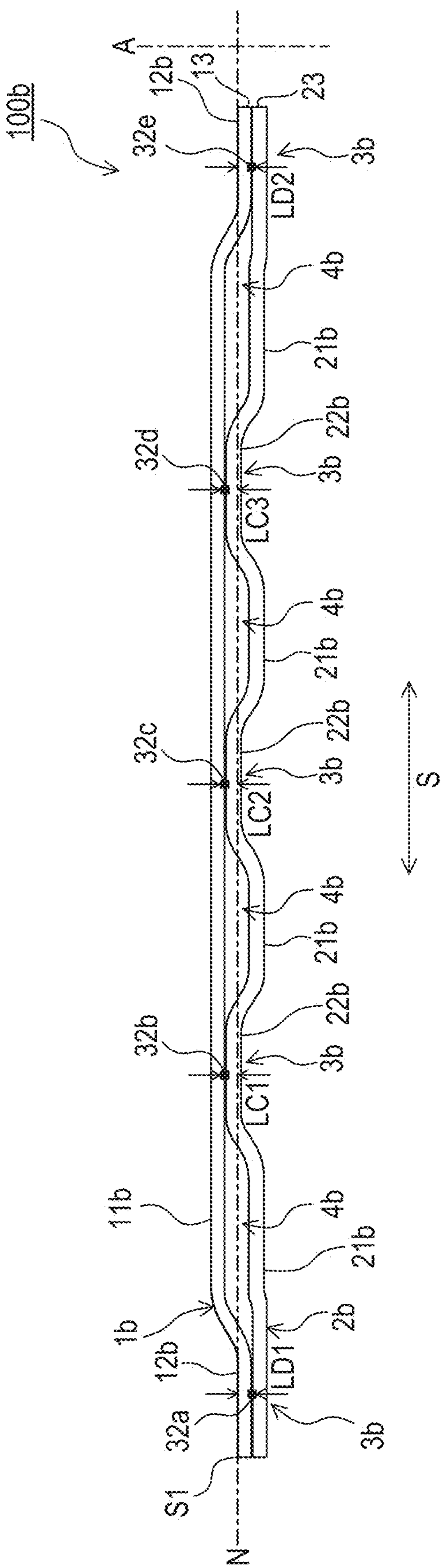
FIG. 8 It is an end view of a heat exchanger of a second modified example in a cross section orthogonal to its longer direction, schematically showing a configuration on one side of the heat exchanger with respect to its center line.

For example, a heat exchanger 100*b* of a second modified example shown in FIG. 8 may have a configuration in which eight flow paths 4*b* are formed by ten joints 3*b*. Specifically, a first plate member 1*b* has two contact portions 11*b* and three non-contact portions 12*b*, and a second plate member 2*b* has seven plate-like portions 21*b* and six projections 22*b*. FIG. 8 illustrates only a configuration of a half on the first end S1 side of the heat exchanger 100*b* with respect to the center line A (hereinafter, referred to as a first portion) for convenience, but the heat exchanger 100*b* has a line-symmetrical structure with respect to the center line A in a cross section of the heat exchanger 100*b*.

In the first portion of the heat exchanger 100*b*, each joint 3*b* has a weld line. The first portion of the heat exchanger 100*b* has five weld lines 32*a* to 32*e*. The three first weld lines 32*b*, 32*c*, 32*d* are arranged in the contact portion 11*b* on the first end S1 side of first plate member 1*b*. The second weld line 32*a* is arranged in the non-contact portion 12*b* at the first end S1 of the first plate member 1*b*, and the second weld line 32*e* is arranged closer to the first end S1 side than each of the through holes 13, 23 in the non-contact portion 12*b* of the first plate member 1*b* located at the center of the shorter direction S.

As a result, a portion of each contact portion 11*b* provided with each flow paths 4*b* and a portion of each contact portion 11*b* provided with each of the first weld lines 32*b*, 32*c*, 32*d* indirectly or directly contact the battery 200. Thus, an area of a surface of each contact portion 11*b* that indirectly or directly contacts the battery 200 and exchanges heat with the battery 200 can be largely secured.

In the first portion of the heat exchanger 100*b*, the number of the first weld lines 32*b*, 32*c*, 32*d* is three, and the number of the second weld lines 32*a*, 32*e* is two. An amount of deformation due to thermal distortion by a joint of the heat exchanger varies depending on a distance between the neutral axis and the weld line of the joint. Thus, as in the heat exchanger 100*b*, in a case of a configuration in which the number of the first weld lines 32*b*, 32*c*, 32*d* and the number of the second weld lines 32*a*, 32*e* differ, the shortest distance from the neutral axis N to the first weld line and the shortest distance from the neutral axis N to the second weld line are set to different values. In the configuration of the heat exchanger 100*b*, each of shortest distances LC1, LC2, LC3 from the neutral axis N to each of the first weld lines 32*b*, 32*c*, 32*d* is set to, for example, 0.8 mm, and each of shortest distances LD1, LD2 from the neutral axis N to each of the second weld lines 32*a*, 32*e* is set to, for example, 1.2 mm.

As a result, a sum of the shortest distances LC1, LC2, LC3 from the neutral axis N to each of the first weld lines 32*b*, 32*c*, 32*d* is approximately the same as a sum of the shortest distances LD1, LD2 from the neutral axis N to each of the second weld lines 32*a*, 32*e*.

This makes it easier for deformation caused on the heat exchanger 100*b* by shrinkage stress when the respective first weld lines 32*b*, 32*c*, 32*d* cool down to be offset by deformation caused on the heat exchanger 100*b* by shrinkage stress when the respective second weld lines 32*a*, 32*e* cool down. Thus, effect of thermal distortion of the heat exchanger 100*b* is reduced. That is, deformation of the first plate member 1*b* is inhibited, making it easier for the two contact portions 11*b* of the first plate member 1*b* to indirectly or directly contact the battery 200. Accordingly, cooling performance of the heat exchanger 100*b* for the battery 200 can be improved.

Figure 9:
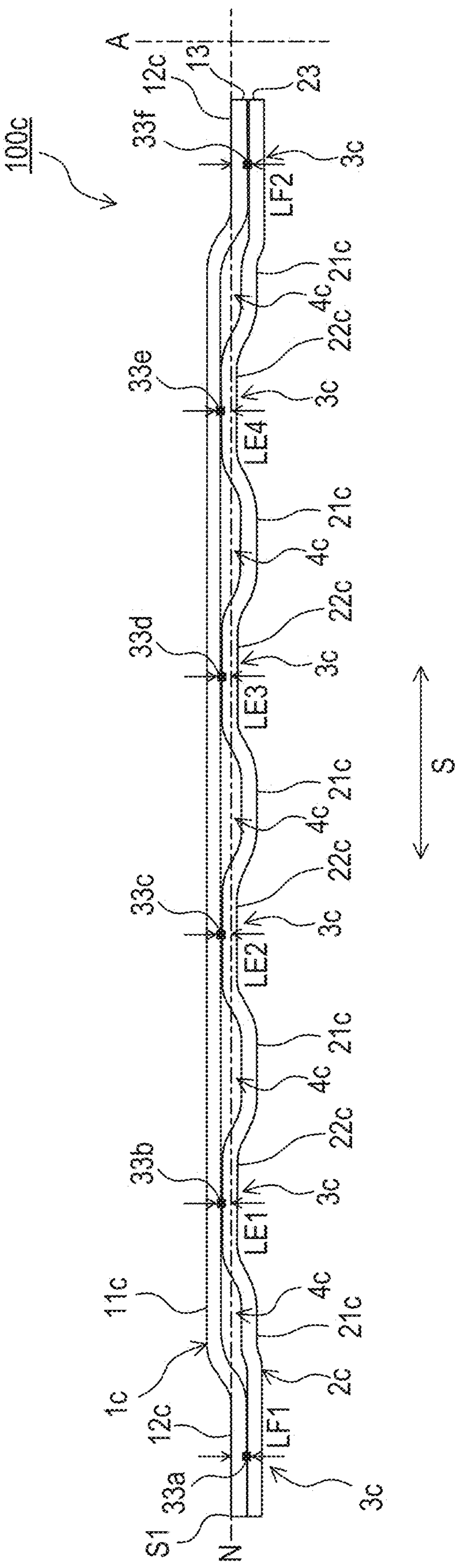
FIG. 9 It is an end view of a heat exchanger of a third modified example in a cross section orthogonal to its longer direction, schematically showing a configuration on one side of the heat exchanger with respect to its center line.

For example, a heat exchanger 100*c* of a third modified example shown in FIG. 9 may have a configuration in which ten flow paths 4*c* are formed by twelve joints 3*c*. Specifically, a first plate member 1*c* may have two contact portions 11*c* and three non-contact portions 12*c*, and a second plate member 2*c* may have nine plate-like portions 21*c* and eight projections 22*c*. FIG. 9 illustrates only a configuration of a half on the first end S1 side of the heat exchanger 100*c* with respect to the center line A (hereinafter, referred to as a second portion) for convenience, but the heat exchanger 100*c* has a line-symmetrical structure with respect to the center line A in a cross section of the heat exchanger 100*c*.

In the second portion of the heat exchanger 100*c*, each joint 3*c* has a weld line. The second portion of the heat exchanger 100*c* has six weld lines 33*a* to 33*f*. The four first weld lines 33*b*, 33*c*, 33*d*, 33*e* are arranged in the contact portion 11*c* on the first end S1 side of the first plate member 1*c*. The second weld line 33*a* is arranged in the non-contact portion 12*c* at the first end S1 of the first plate member 1*c*. The second weld line 33*f* is arranged closer to the first end S1 side than each of the through holes 13, 23 in the non-contact portion 12*c* of the first plate member 1*c* located at the center of the shorter direction S.

As a result, a portion of each contact portion 11*c* provided with each flow path 4*c* and a portion of each contact portion 11*c* provided with each of the first weld lines 33*b*, 33*c*, 33*d*, 33*e* indirectly or directly contact the battery 200. Thus, an area of a surface of each contact portion 11*c* that indirectly or directly contacts the battery 200 and exchanges heat with the battery 200 can be largely secured.

In the second portion of the heat exchanger 100*c*, the number of the first weld lines 33*b*, 33*c*, 33*d*, 33*e* is four, and the number of the second weld lines 33*a*, 33*f* is two. In the heat exchanger 100*c*, similar to the heat exchanger 100*b*, the number of the first weld lines 33*b*, 33*c*, 33*d*, 33*e* and the number of the second weld lines 33*a*, 33*f* differ. Thus, in the configuration of the heat exchanger 100*c*, each of shortest distances LE1, LE2, LE3, LE4 from the neutral axis N to each of the first weld lines 33*b*, 33*c*, 33*d*, 33*e* is set to, for example, 0.7 mm, and each of shortest distances LF1, LF2 from the neutral axis N to each of the second weld lines 33*a*, 33*f* is set to, for example, 1.4 mm. As a result, a sum of the shortest distances LE1, LE2, LE3, LE4 from the neutral axis N to each of the first weld lines 33*b*, 33*c*, 33*d*, 33*e* is approximately the same as a sum of the shortest distances LF1, LF2 from the neutral axis N to each of the second weld lines 33*a*, 33*f*.

This makes it easier for deformation caused on the heat exchanger 100*c* by shrinkage stress when the respective first weld lines 33*b*, 33*c*, 33*d*, 33*e* cool down to be offset by deformation caused on the heat exchanger 100*c* by shrinkage stress when the respective second weld lines 33*a*, 33*f* cool down. Thus, the effect of thermal distortion of the heat exchanger 100*c* is reduced. That is, deformation of the first plate member 1*c* is inhibited, making it easier for the two contact portions 11*c* of the first plate member 1*c* to indirectly or directly contact the battery 200. Accordingly, cooling performance of the heat exchanger 100*c* for the battery 200 can be improved.

(3c) In the above-described embodiment and first to third modified examples, an example of the configuration was given in which the shortest distances from the neutral axis N to each of the first weld lines are constant, and the shortest distances from the neutral axis N to each of the second weld lines are constant. However, for example, if the sum of the shortest distances from the neutral axis N to each of the first weld lines is approximately the same as the sum of the shortest distances from the neutral axis N to each of the second weld lines, values of the respective shortest distances do not have to be constant.

(3d) In the above-described embodiment and first to third modified examples, the weld lines are arranged line-symmetrically with respect to the center line A in the cross section of the heat exchanger. However, for example, if the sum of the shortest distances from the neutral axis N to each of the first weld lines is approximately the same as the sum of the shortest distances from the neutral axis N to each of the second weld lines, the weld lines do not have to be arranged line-symmetrically with respect to the center line A.

(3e) In the above-described embodiment and first to third modified examples, the first weld lines and the second weld lines extend in the longer direction L of the heat exchanger 100*b* to form the six flow paths 4. However, for example, the first weld lines and the second weld lines may extend in the shorter direction S of the heat exchanger to form two or more flow paths through which the heat exchange medium flows.

(3f) In the above-described embodiment and first to third modified examples, the first weld lines are arranged in the contact portions 11 of the first plate member 1, but the first weld lines do not have to be arranged in the contact portions.

Figure 10:
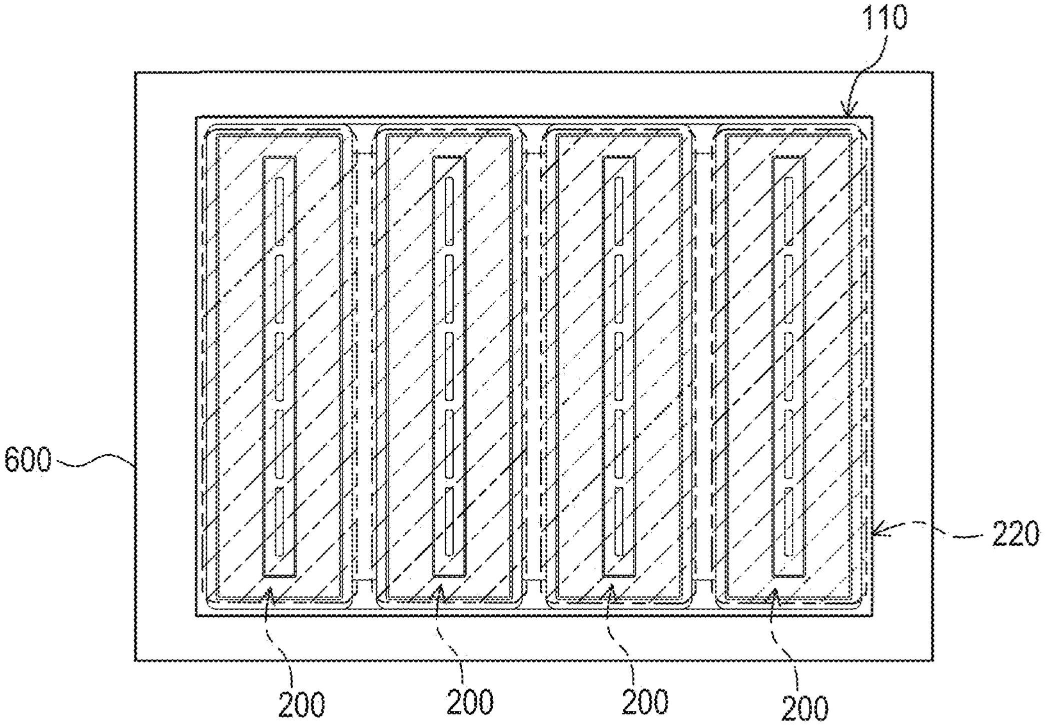
FIG. 10 It is a schematic view of a heat exchange apparatus arranged in association with a battery pack.
Figure 11:
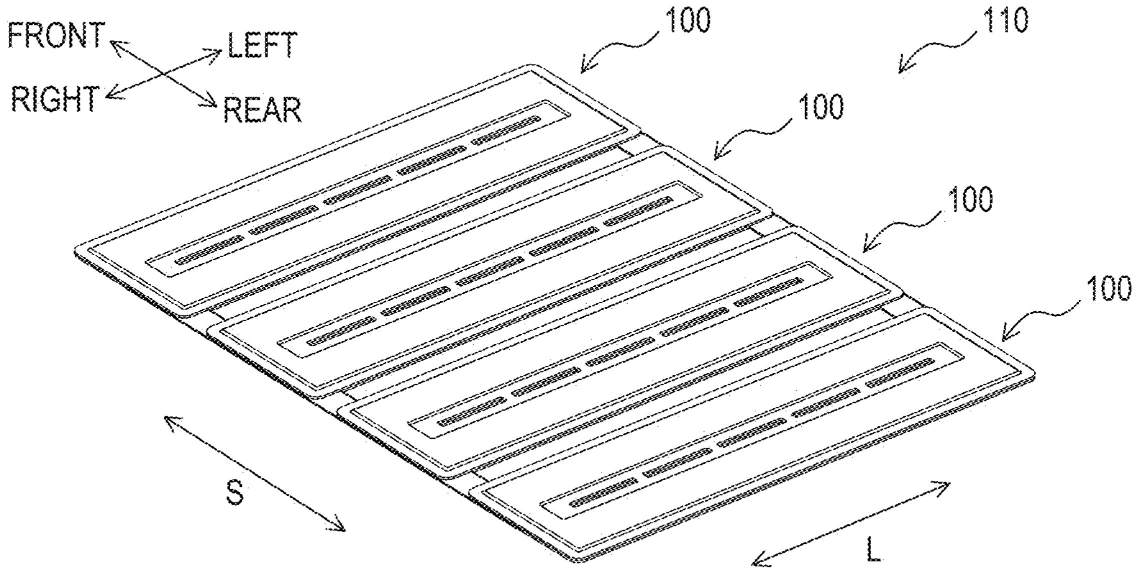
FIG. 11 It is schematic view of a heat exchange apparatus in which two or more heat exchangers are coupled together.

(3g) In the above-described embodiment, an example of the heat exchanger 100 having a size adapted to the battery 200 was given. However, for example, two or more of the heat exchangers 100 may be aligned in the shorter direction S and coupled to each other so as to be adapted to a battery pack 220 shown in FIG. 10 which is arranged inside an annular frame 600 and composed of a combination of two or more of the batteries 200 (see FIG. 11). A heat exchange apparatus 110 in which the heat exchangers 100 are coupled together is arranged to face the battery pack 220. In an example shown in FIG. 11, in a state where the heat exchanger 100 is installed in an electric vehicle, the longer direction L of the heat exchanger 100 is a right-left direction of the electric vehicle, and the shorter direction S of the heat exchanger 100 is a front-rear direction of the electric vehicle. In a state where the heat exchanger 100 is installed in the electric vehicle, the longer direction L of the heat exchanger 100 may be the front-rear direction of the electric vehicle, and the shorter direction S of the heat exchanger 100 may be the right-left direction of the electric vehicle.

Figure 12:
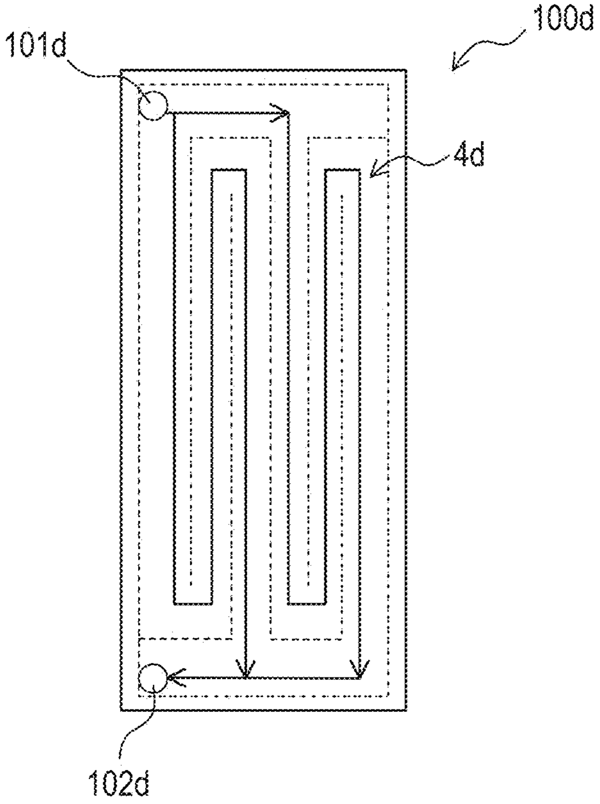
FIG. 12 It is a schematic view of a heat exchanger of a fourth modified example showing a shape of a flow path.
Figure 13:
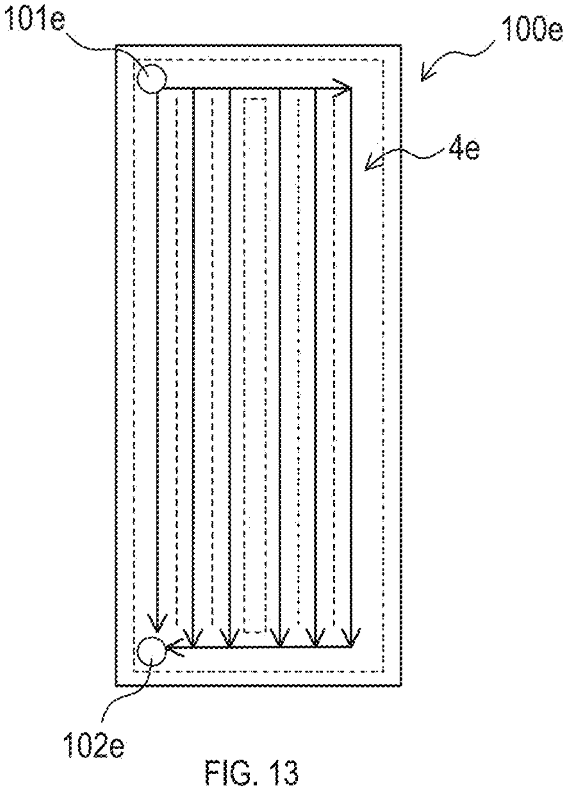
FIG. 13 It is a schematic view of a heat exchanger of a fifth modified example showing a shape of a flow path.

(3h) In the above-described embodiment, an example of the shape of the flow paths 4 through which the heat exchange medium flows from the inflow port 101 to the discharge port 102 along the arrows shown in FIG. 4 was given, but the shape of the flow path is not limited to this. For example, as shown in FIG. 12, a heat exchanger 100*d* of a fourth modified example may have a flow path 4*d* having a shape as shown by arrows through which the heat exchange medium flows from an inflow port 101*d* to a discharge port 102*d*. Also, for example, as shown in FIG. 13, a heat exchanger 100*e* of a fifth modified example may have a flow path 4*e* having a shape as shown by arrows through which the heat exchange medium flows from an inflow port 101*e* to a discharge port 102*e*.

(3i) In the above-described embodiment, heat was input to each joint 3 under certain conditions in the joining process S30. That is, in the above-described embodiment, the amount of heat input during formation of each of the weld lines 31*a* to 31*h* was approximately the same. However, for example, heat may be input to each joint under different conditions in the joining process S30. That is, the amount of heat input during formation of each weld line may differ.

Here, when the amount of heat input changes, shrinkage stress when the weld line cools down changes. Thus, for example, the effect of thermal distortion of the heat exchanger may be evaluated in consideration of the amount of heat input during formation of each weld line, in addition to the shortest distance from the neutral axis N to each weld line. For example, in case that the amount of heat input is taken into consideration in a configuration in which the heat exchanger has two or more weld lines, a sum of values obtained for each of the first weld lines by multiplying the shortest distance from the neutral axis N to each of the first weld lines by the amount of heat input during formation of each of the first weld lines may be approximately the same as a sum of values obtained for each of the second weld lines by multiplying the shortest distance from the neutral axis N to each of the second weld lines by the amount of heat input during formation of each of the second weld lines.

Specifically, when the heat exchanger 100 has eight weld lines 31*a* to 31*h* as in the above-described embodiment, the following equation may be established: ((shortest distance LA1×amount of heat input QA1)+(shortest distance LA2×amount of heat input QA2)+(shortest distance LA3×amount of heat input QA3)+(shortest distance LA4×amount of heat input QA4))=((shortest distance LB1×amount of heat input QB1)+(shortest distance LB2×amount of heat input QB2)+(shortest distance LB3×amount of heat input QB3)+(shortest distance LB4×amount of heat input QB4)). The amounts of heat input QA1 to QA4 are the amounts of heat input during formation of the first weld lines 31*b*, 31*c*, 31*f*, 31*g*, respectively. Also, the amounts of heat input QB1 to QB4 are the amounts of heat input during formation of the second weld lines 31*a*, 31*d*, 31*e*, 31*h*, respectively.

As a result, even if shrinkage stress when each weld line cools down differs due to difference in the amount of heat input, deformation caused on the heat exchanger by shrinkage stress when each first weld line cools down is likely to be offset by deformation caused on the heat exchanger by shrinkage stress when each second weld line cools down. Thus, the effect of thermal distortion can be reduced also in the heat exchanger comprising the joints to which heat is input under different conditions during welding, in consideration of the shape, thickness, size and the like of the heat exchanger. That is, by taking the amount of heat input into consideration, it becomes easier to expand the range of design of the heat exchanger that improves cooling performance. In the joining process S30, even if heat is input to the joints under certain conditions and the amount of heat input during formation of each weld line is approximately the same, the amount of heat input during formation of each weld line, in addition to the shortest distance from the neutral axis to each weld line, may be taken into consideration of the evaluation of the effect of thermal distortion of the heat exchanger.

(3j) A function/functions of one element in the above-described embodiments may be distributed as two or more elements, or a function/functions of two or more elements may be integrated into one element. Part of the configuration of the above-described embodiments may be omitted. At least part of the configuration of the above-described embodiments may be added to or replaced with a configuration of other embodiments.

4. Technical Idea Disclosed in Present Specification

[Item 1]

A heat exchanger that exchanges heat with a battery installed in an electric vehicle, comprising:

a first plate member that is a plate-like member configured to face the battery;

a second plate member that is a plate-like member arranged to face an opposite side of a side facing the battery of the first plate member, the second plate member forming a flow path through which a heat exchange medium passes between the first plate member and the second plate member; and two or more joints that are portions where the first plate member and the second plate member are joined by welding, each of the joints having one of weld lines that extend in a first direction and are aligned in a second direction orthogonal to the first direction to define the flow path, each of the weld lines being arranged on either of the first plate member side and the second plate member side with respect to a neutral axis that extends in the second direction in a cross section of the heat exchanger orthogonal to the first direction, among the weld lines, a weld line(s) located closer to the first plate member side than the neutral axis being referred to as at least one first weld line, and a weld line(s) located closer to the second plate member side than the neutral axis being referred to as at least one second weld line, and a sum of shortest distances from the neutral axis to each of the at least one first weld line being approximately same as a sum of shortest distances from the neutral axis to each of the at least one second weld line.

[Item 2]

The heat exchanger according to Item 1, wherein a number of the at least one first weld line and a number of the at least one second weld line are same, and the shortest distances from the neutral axis to each of the at least one first weld line and the shortest distances from the neutral axis to each of the at least one second weld line are same.

[Item 3]

The heat exchanger according to Item 1 or Item 2, wherein the weld lines are arranged line-symmetrically with respect to a center line in the cross section, and the center line is a line that passes through a center of the second direction in the cross section and is perpendicular to the neutral axis.

[Item 4]

The heat exchanger according to any one of Item 1 to Item 3, wherein the first direction is a longer direction of the heat exchanger.

[Item 5]

The heat exchanger according to any one of Item 1 to Item 4, wherein the first plate member has a contact portion that contacts the battery, and expands in approximately parallel to the neutral axis and approximately flatly in the first direction and the second direction, and the at least one first weld line is arranged in the contact portion.

[Item 6]

The heat exchanger according to any one of Item 1 to Item 5, wherein the weld lines are formed by heat input to the joints, and a sum of values obtained for each of the at least one first weld line by multiplying the shortest distance from the neutral axis to each of the at least one first weld line by an amount of heat input during formation of each of the at least one first weld line being approximately same as a sum of values obtained for each of the at least one second weld line by multiplying the shortest distance from the neutral axis to each of the at least one second weld line by an amount of heat input during formation of each of the at least one second weld line.

[Item 7]

A method for manufacturing a heat exchanger according to any one of Item 1 to Item 5, comprising:

placing the first plate member and the second plate member on top of each other so that the first plate member and the second plate member are in contact at the joints; and forming the weld lines by heat input to the joints to join the first plate member and the second plate member, a sum of values obtained for each of the at least one first weld line by multiplying the shortest distance from the neutral axis to each of the at least one first weld line by an amount of heat input during formation of each of the at least one first weld line being approximately same as a sum of values obtained for each of the at least one second weld line by multiplying the shortest distance from the neutral axis to each of the at least one second weld line by an amount of heat input during formation of each of the at least one second weld line.

The invention claimed is:

1. A heat exchanger that exchanges heat with a battery installed in an electric vehicle, comprising:

a first plate member that is a plate-like member configured to face the battery;

a second plate member that is a plate-like member arranged to face an opposite side of a side facing the battery of the first plate member, the second plate member forming a flow path through which a heat exchange medium passes between the first plate member and the second plate member; and two or more joints that are portions where the first plate member and the second plate member are joined by welding, each of the joints having one of weld lines that extend in a first direction and are aligned in a second direction orthogonal to the first direction to define the flow path, each of the weld lines being arranged on either of the first plate member side and the second plate member side with respect to a neutral axis that extends in the second direction in a cross section of the heat exchanger orthogonal to the first direction, among the weld lines, a weld line(s) located closer to the first plate member side than the neutral axis being referred to as at least one first weld line, and a weld line(s) located closer to the second plate member side than the neutral axis being referred to as at least one second weld line, and a sum of shortest distances from the neutral axis to each of the at least one first weld line being approximately same as a sum of shortest distances from the neutral axis to each of the at least one second weld line.

2. The heat exchanger according to claim 1, wherein a number of the at least one first weld line and a number of the at least one second weld line are same, and the shortest distances from the neutral axis to each of the at least one first weld line and the shortest distances from the neutral axis to each of the at least one second weld line are same.

3. The heat exchanger according to claim 1, wherein the weld lines are arranged line-symmetrically with respect to a center line in the cross section, and the center line is a line that passes through a center of the second direction in the cross section and is perpendicular to the neutral axis.

4. The heat exchanger according to claim 1, wherein the first direction is a longer direction of the heat exchanger.

5. The heat exchanger according to claim 1, wherein, the first plate member has a contact portion that contacts the battery, and expands in approximately parallel to the neutral axis and approximately flatly in the first direction and the second direction, and the at least one first weld line is arranged in the contact portion.

6. The heat exchanger according to claim 1, wherein, each of the weld lines is formed by heat input to a corresponding one of the joints, and a sum of values obtained for each of the at least one first weld line by multiplying the shortest distance from the neutral axis to each of the at least one first weld line by an amount of heat input during formation of each of the at least one first weld line is approximately same as a sum of values obtained for each of the at least one second weld line by multiplying the shortest distance from the neutral axis to each of the at least one second weld line by an amount of heat input during formation of each of the at least one second weld line.

* * * * *